March 31, 1964 G. DIEMER 3,127,534

ELECTROLUMINESCENT ELEMENT WITH AN ENAMEL COATED BASE

Filed Jan. 31, 1961

INVENTOR
*GESINUS DIEMER*
BY
Frank R. Jifani
AGENT

United States Patent Office 3,127,534

Patented Mar. 31, 1964

3,127,534
ELECTROLUMINESCENT ELEMENT WITH AN ENAMEL COATED BASE

Gesinus Diemer, Eindhoven, Netherlands, assignor to North American Philips Company, Inc., New York, N.Y., a corporation of Delaware Filed Jan. 31, 1961, Ser. No. 86,226
Claims priority, application Netherlands Feb. 4, 1960
2 Claims. (Cl. 313—108)

Figure 1:
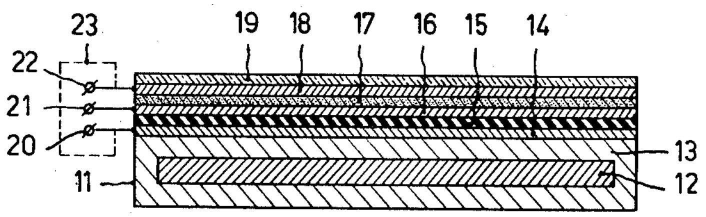

This invention relates to electroluminescent elements built up of a carrier and a layer of electroluminescent material enclosed between two conductive layers, at least one of which is permeable to the radiation emitted by the electroluminescent layer when a voltage is applied between the two conductive layers.

Electroluminescent elements comprising a layer of electroluminescent material enclosed between two conductive layers are known. Thus, for example, an element has been described comprising a metallic carrier and on this carrier an electroluminescent layer of zinc sulphide containing some activator or other and a translucent conductive layer which is provided on the electroluminescent layer on the side remote from the carrier and is usually covered with a glass layer for moisture-tight sealing. The term "conductive layers" is to be understood herein to mean electrodes galvanically led to the exterior and provided with a terminal. In such an element the metallic carrier serves at the same time as a conductive layer. The electroluminescent layer emits radiation upon applying an electric potential between the conductive layers and more particularly an alternating voltage. The radiation emitted by the electro-luminescent layer can leave the element through the translucent conductive layer and the glass layer. During the use of the element at least one conductive layer is at a potential which differs from earth potential. Upon touching the element, one is exposed to an electric voltage either directly, or through capacitative penetration. In addition, when used in a damp atmosphere, the metal carrier is attached by corrosion. This may be inhibited by covering the metal carrier with an enamel layer. Naturally a bare portion for the electric connection is still necessary, so that the element remains unsuitable for use in a damp atmosphere or outdoors. In another known embodiment, the element comprises a glass carrier body made electrically conductive on one side, an electroluminescent layer provided on the conductive layer, and a second conductive layer which is provided on the electroluminescent layer on the side remote from the carrier and which need not be translucent. During the use of this element, similar drawbacks arise as in the case first described. Besides, a glass carrier has the disadvantage that the element is fragile and shaping into a form with curved surfaces and holes is more difficult to realize. In addition, when the light is radiated through the glass carrier, it is particularly difficult to form figures with sharp boundaries because of the multiple reflections. Such figures with sharp boundaries are used, for example, in logistic networks in combination with photoconductors wherein a one to one correspondence is required.

An object of the invention is to mitigate these disadvantages by providing a particular structure. An electroluminescent element according to the invention is characterized in that the carrier consists of metal surrounded by enamel on all sides and the element comprises a third conductive layer and at least one insulating layer, an insulating layer being provided between the third conductive layer and one of the other conductive layers, in a manner such that at least the layers present on the side of the layer of electroluminescent material remote from the carrier are permeable to the radiation emitted by the electroluminescent layer when a voltage is applied between the two conductive layers. Such a structure affords the advantage that the two conductive layers located most outwards may be connected together and are thus at the same potential during the use of the element. This means a good safeguarding if the element should be touched, more particularly if such layers have earth potential and the presence of a live layer on the outer side of the element is thus avoided. For this purpose, the third conductive layer in the element is preferably electrically connected to the conductive layer present on the side of the electroluminescent layer remote from the third conductive layer. Since the carrier consists of metal surrounded by enamel on all sides, it is not subject to corrosion. The enamel layer may be very thin, since the third conductive layer prevents capacitative penetration. As a matter of fact, the metal and the enamel will preferably be chosen to have substantially the same coefficient of expansion. All electroluminescent materials and more particularly activated zinc sulphides are suitable as electroluminescent substances for use in an element according to the invention. The conductive layers are, for example, metallic layers provided by evaporation and consisting of aluminum suspended or squirted layers of powdery silver or gold which may be so thin as to be translucent. Translucent conductive layers which preferably enter into account are activated tin oxide or titanium oxide. As a matter of fact the conductive layers which need not be translucent may also consist of tin oxide, since it has the advantage that it is chemically resistant and may be provided in a simple manner at low cost. Dependently upon the circumstance whether the insulating layer must be translucent or not, it is made of, for instance, either transparent glass enamel or a pigmented glass enamel, or it is in the form of a pigmented organic insulating layer. The pigment is, for example, titanium oxide powder or barium-titanate powder.

The functions of several adjoining layers may be combined in one layer. Thus the enamel layer on the carrier may serve as an insulating layer. The third conductive layer may thus be provided directly on the metal carrier surrounded on all sides by enamel.

Figure 2:
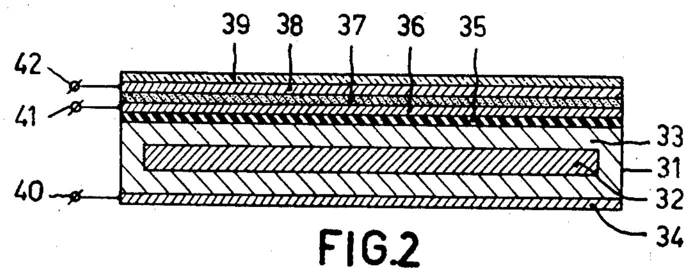
Figure 3:
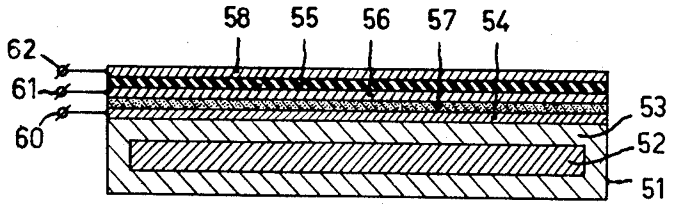

In order that the invention may be readily carried into effect, it will now be described in detail, by way of example, with reference to the accompanying drawing, in which FIGURES 1, 2 and 3 are diagrammatic cross-sections of electroluminescent elements, the mutual thicknesses of the layers not being shown to scale.

FIGURE 1 is a diagrammatic view of a cross-section of an electroluminescent element according to the invention. A carrier 11 is built up of an iron core 12 surrounded on all sides by glass enamel 13 having a composition of 16% by weight of $Li_2O$, 5% by weight of CaO, 30% by weight of $SiO_2$, 24% by weight of $B_2O_3$ and 25% by weight of ZnO. On the carrier 11 are present successively a conductive layer 14 of tin oxide, an insulating layer 15 consisting of glass enamel and titanium oxide pigment, a conductive layer 16 of tin oxide, an electroluminescent layer 17 of glass enamel and zinc sulphide which is activated, for example with copper, silver, gold manganese or a combination thereof and coactivated with aluminum of chlorine and a translucent conductive layer 18 of tin oxide. The glass enamel of the layers 15 and 17 consists of 5% by weight of $Na_2O$, 10% by weight of $Li_2O$, 10% by weight of CaO, 30% by weight of $SiO_2$, 20% by weight of $B_2O_3$ and 25% by weight of ZnO. For protection of the assembly, the layer 18 is covered with a translucent enamel layer 19 having a composition of 4.1% by weight of $Na_2O$, 2.6% by weight of $K_2O$, 1.4% by weight of CaO, 1.4% by weight of ZnO, 40.7% by weight of PbO, 4.0% by weight of CdO, 2.1% by weight of $Al_2O_3$, 20.4% by weight of $SiO_2$, 13.3% by weight of $B_2O_3$, 3.9% by weight of $TiO_2$ and 6.0% by weight of $ZnO_2$. The conductive layer 14 is provided with a connecting terminal 20, the conductive layer 16 with a connecting terminal 21 and the translucent conductive layer 18 with a connecting terminal 22. During use, the terminals 20 and 22 are brought to earth potential, whereas the terminal 21 is connected to a source of alternating voltage. If desired, the conductive layers 14 and 18 in the element may be electrically connected, as indicated by a broken line 23. Consequently in this case one of the terminals 20 and 22 only need be brought to earth potential.

FIGURE 2 is a third diagrammatic view of a cross section of an electroluminescent element according to the invention. A carrier 31 comprises a chrome-iron core 32 surrounded on all sides by glass enamel 33. On the carrier 31 are present successively an insulating layer 35 consisting of glass enamel and barium-titanate pigment, a conductive layer 36 of tin oxide, an electroluminescent layer 37 of activated zinc sulphide, and a translucent conductive layer 38 of tin oxide. The layer 38 is covered, for protection, with a transparent enamel layer 39. Provided on the other side of the carrier 31 is a conductive layer 34 of tin oxide, which is provided with a connecting terminal 40. The conductive layer 36 and the translucent conductive layer 38 are provided with connecting terminals 41 and 42 respectively. During use, the terminals 40 and 42 are brought to earth potential, whereas the terminal 41 is connected to a source of alternating voltage.

In the diagrammatic view of a cross-section of the electro-luminescent element as shown in FIGURE 3, a carrier 51 comprises a nickel-iron core 52 surrounded on all sides by glass enamel 53. On the carrier 51 are present successively a conductive layer 54 of titanium oxide, an eletcroluminescent layer 57 of activated zinc sulphide, a translucent conductive layer 56 of tin oxide, an insulating translucent layer 55 of glass enamel, and a translucent conductive layer 58 of tin oxide. The conductive layer 54 is provided with a connecting terminal 60, the transparent conductive layer 56 with a connecting terminal 61 and the translucent conductive layer 58 with a connecting terminal 62. During use, the terminals 60 and 62 are brought to earth potential, whereas the terminal 61 is connected to a source of alternating voltage.

What is claimed is:

1. An electroluminescent element built up of a carrier and a layer of electroluminescent material enclosed between two conductive layers, at least one of which is permeable to the radiation emitted by the electroluminescent layer when applying a voltagt between the two conductive layers, characterized in that the carrier consists of metal surrounded by enamel on all sides and that the element comprises, in addition, a third conductive layer and at least one insulating layer, an insulating layer being provided between the third conductive layer and one of the other conductive layers, in a manner such that at least the layers present on the side of the layer of electroluminescent material remote from the carrier are permeable to the radiation emitted by the electroluminescent layer upon applying a voltage between the two conductive layers.

2. An electroluminescent element as claimed in claim 1, characterized in that the third conductive layer in the element is electrically connected to the conductive layer present on the side of the electroluminescent layer remote from the third conductive layer.

References Cited in the file of this patent

UNITED STATES PATENTS

| | | |
|---|---|---|
| 2,716,298 | Spielmann et al. | Aug. 30, 1955 |
| 2,827,567 | Strange | Feb. 3, 1958 |
| 2,858,632 | Caserio | Nov. 4, 1958 |